United States Patent
Arai et al.

(10) Patent No.: US 6,273,317 B1
(45) Date of Patent: Aug. 14, 2001

(54) FLOW SOLDERING APPARATUS HAVING RESILIENT SUBSTRATE CLAMPING MECHANISM AND SOLDER OXIDE FILM REMOVING MECHANISM

(75) Inventors: Kenji Arai, Okazaki; Ataru Ichikawa; Atsushi Furumoto, both of Kariya; Tatuya Kubo, Ogaki; Misao Tanaka, Takahama; Mitsuhiro Sugiura, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/420,579

(22) Filed: Oct. 19, 1999

(30) Foreign Application Priority Data

Oct. 29, 1998 (JP) .................................. 10-309115
Nov. 17, 1998 (JP) .................................. 10-326606
Nov. 17, 1998 (JP) .................................. 10-326607

(51) Int. Cl.$^7$ ........................... B23K 16/00; B23K 31/02
(52) U.S. Cl. ................................. 228/8; 228/33; 228/37
(58) Field of Search ................................ 228/8, 9, 10, 37, 228/33

(56) References Cited

U.S. PATENT DOCUMENTS

| | | | |
|---|---|---|---|
| 4,410,127 | * 10/1983 | Bodewig | 228/180 A |
| 4,667,868 | * 5/1987 | Decker et al. | 228/49.1 |
| 4,706,602 | * 11/1987 | Polacek | 118/63 |
| 5,263,632 | * 11/1993 | Zadrick et al. | 228/49.1 |
| 5,402,563 | * 4/1995 | Satoh et al. | 29/829 |
| 5,454,505 | * 10/1995 | Kearns | 228/39 |
| 5,820,013 | * 10/1998 | Ortiz | 228/43 |

FOREIGN PATENT DOCUMENTS

| | | |
|---|---|---|
| 358086753A | * 5/1983 | (JP) . |
| 58-119962 | 8/1983 | (JP) . |
| 63315969A | * 12/1988 | (JP) . |
| 1-110415 | 4/1989 | (JP) . |
| 1-231396 | 9/1989 | (JP) . |
| 1-233791 | 9/1989 | (JP) . |
| 401282887A | * 11/1989 | (JP) . |
| 404356354A | 12/1992 | (JP) . |
| 406077642A | * 3/1994 | (JP) . |
| 406198431A | * 7/1994 | (JP) . |
| 7-288380 | 10/1995 | (JP) . |
| 408020853A | * 1/1996 | (JP) . |
| 02000151090A | * 5/2000 | (JP) . |

* cited by examiner

Primary Examiner—Tom Dunn
Assistant Examiner—Kiley Stoner
(74) Attorney, Agent, or Firm—Pillsbury Winthrop LLP

(57) ABSTRACT

In a flow soldering apparatus, a substrate is clamped by a pair of nails of a chuck mechanism and transferred over a molten solder barrel while being held in contact with a molten solder. The nails are held resiliently to each other, so that the substrate is allowed to expand thermally between the nails without bowing. The chuck mechanism has a scraper nail which extends transversely over the entire lateral length of the substrate at the front side of the substrate in a substrate transfer direction to push away an oxide film formed on the molten solder. The chuck mechanism is constructed to allow the molten solder to enter underneath the substrate in the lateral direction with respect to the substrate transfer direction. After completing one soldering operation, the nails change the set of the opposing two sides to another set of two opposing sides of the substrate, so that the substrate is subjected to the soldering operation from a direction different from the preceding soldering operation.

19 Claims, 15 Drawing Sheets

FLOW SOLDERING APPARATUS HAVING RESILIENT SUBSTRATE CLAMPING MECHANISM AND SOLDER OXIDE FILM REMOVING MECHANISM

CROSS REFERENCE TO RELATED APPLICATION

This application relates to and claims priority of Japanese Patent Applications No. 10-309115 filed on Oct. 29, 1998, No. 10-326606 filed on Nov. 17, 1998, and No. 10-326607 filed on Nov. 17, 1998, the contents of which are incorporated herein by reference.

BACKGROUND OF THE INVENTION

1. Field of the Invention

The present invention relates to a flow soldering apparatus, and more particularly to a flow soldering apparatus by which a substrate mounted with electronic circuit parts is contacted to a solder flow to solder the electronic circuit parts to the substrate.

2. Related Art

A flow soldering apparatus is used to solder electronic circuit parts to a circuit substrate such as a printed circuit board on which the electronic circuit parts are mounted. This flow soldering apparatus grips both side ends of the substrate firmly, transfers the same to a flow solder barrel and contacts the same to the solder flow for soldering by a robot arm as disclosed in JP-A-7-288380.

The substrate undergoes thermal expansion when it is contacted with the molten solder in the solder barrel. The substrate bows, because it is clamped at its both side ends. Thus, the quality of the soldering of the circuit parts on the substrate is lessened, and the resulting substrate will have a deformation.

Further, the molten solder in the solder barrel is oxidized when exposed in the air. Thus, an oxide film (oxides) is formed on the surface of the molten solder. When the substrate is transferred over the solder barrel in contact with the molten solder, the oxide film contacts the substrate and lessens the quality of the soldering. JP-U-58-119962 discloses a substrate holder unit having three peripheral walls. The walls hold the substrate and removes the oxide film. However, the walls tend to cause a space between the substrate and the molten solder right behind the front wall, because the substrate is held above the bottom end of the walls. As a result, unsoldered parts are likely to occur on the substrate, thus lessening the quality of the soldering.

The above JP-A-7-288380 proposes to rotate the substrate so that the soldering is effected from different directions. In this soldering operation, it is likely to occur that the molten solder jumps onto the upper surface of the substrate which should not be soldered.

SUMMARY OF THE INVENTION

It is therefore an object of the present invention to improve the quality of soldering. More specifically, the present invention is made to restrict a thermal deformation of a substrate. The present invention is made to remove an oxide film of molten solder without stopping a soldering operation. Further, the present invention is made to restrict jumping of molten solder onto a substrate.

According to a first aspect of the present invention, a substrate is clamped by a pair of nails of a chuck mechanism and transferred over a molten solder barrel while being held in contact with the molten solder. The nails are held resiliently to each other, so that the substrate is allowed to expand thermally between the nails without bowing.

According to a second aspect of the present invention, a chuck mechanism for clamping a substrate and transferring the substrate over a molten solder barrel. The chuck mechanism has a part which extends transversely over the entire lateral length of the substrate at the front side of the substrate in a substrate transfer direction to push away an oxide film formed on a molten solder. The chuck mechanism is constructed to allow the molten solder to enter underneath the substrate in the lateral direction with respect to the substrate transfer direction. Thus, the substrate is transferred in contact with the molten solder without contacting the oxide film. The part may be a scraper nail provided at the front side of the chuck mechanism in the substrate transferring direction.

According to a third aspect of the present invention, a chuck mechanism has a pair of nails for clamping a substrate at a set of opposing two sides of a substrate. The chuck mechanism transfers the substrate in a manner that the opposing two sides are maintained at a front side and a rear side with respect to a substrate transfer direction during a soldering operation. After completing the first soldering operation, the nails change the set of the opposing two sides to another set of two opposing sides of the substrate. The chuck mechanism subjects the substrate to the similar soldering operation while maintaining another set of two opposing sides of the substrate at the front side and the rear side with respect to the substrate transfer direction.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE PREFERRED EMBODIMENT

Figure 1:
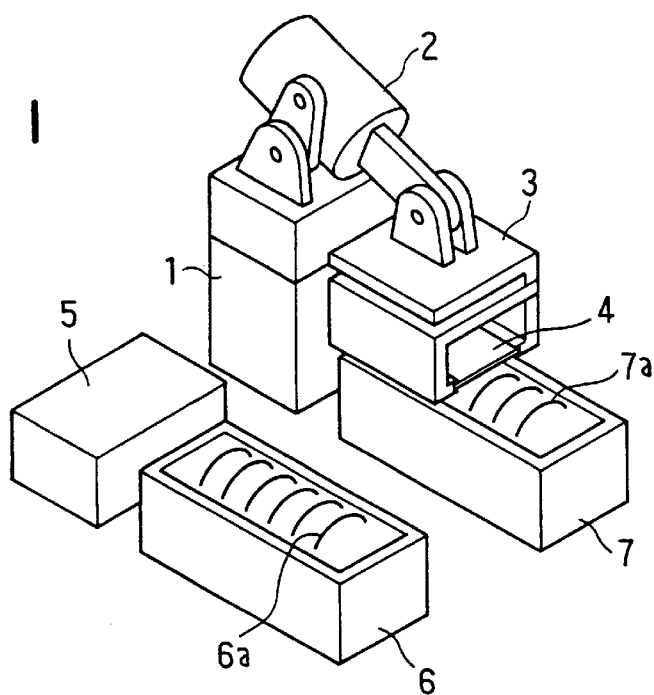
FIG. 1 is a perspective view of a flow soldering apparatus according to a first embodiment of the present invention.

The present invention will be described in detail with reference to various embodiments in which the same or similar reference numerals are used to designate the same or similar parts.

(First Embodiment)

A flow soldering apparatus according to this embodiment is shown in FIG. 1 in perspective. A robot 1 is installed on a floor. The robot 1 has an arm 2. A chuck mechanism 3 is provided at the top end of the arm 2 so that the chuck mechanism 3 is capable of clamping a substrate 4. A plurality of electronic circuit parts 50 (FIG. 5) are mounted on the substrate 4. The robot arm 2 transfers the chuck mechanism 3 to a desired position in a desired direction by way of rotation, expansion/contraction and the like motion through joints and the like. This robot arm 2 transfers the chuck mechanism 3 and hence the substrate 4.

Figure 2:
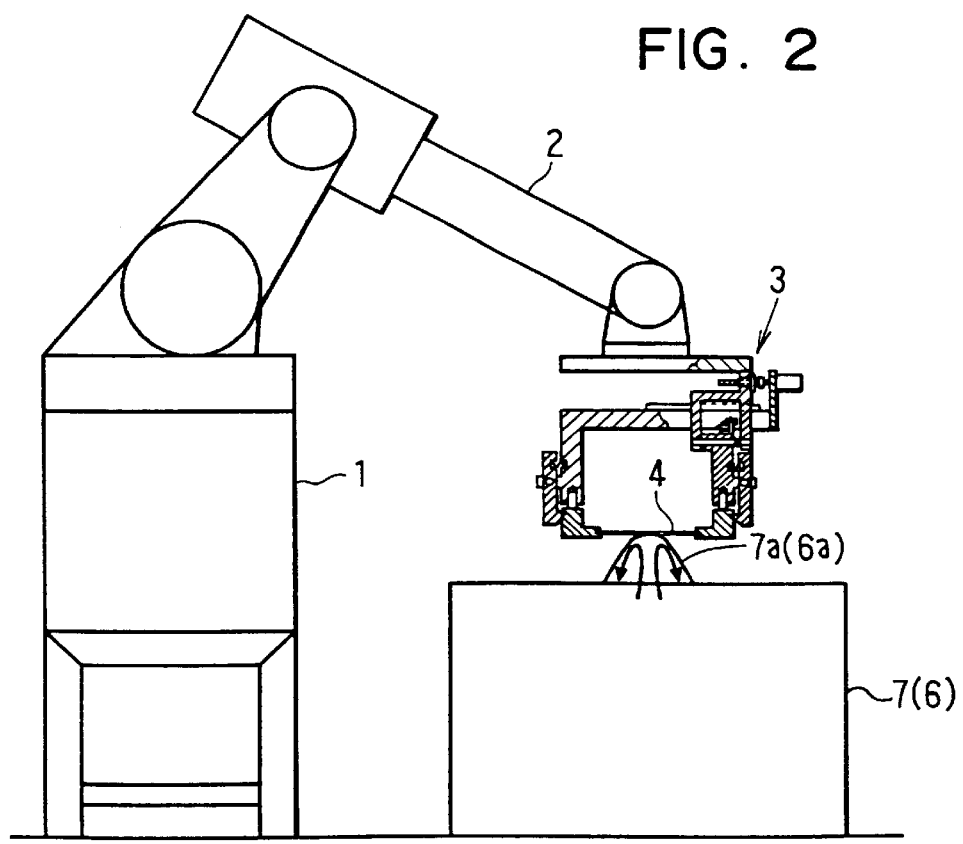
FIG. 2 is an elevational view of the flow soldering apparatus shown in FIG. 1.

In FIG. 1, a pre-heater 5, a primary flow solder barrel 6 and a secondary flow solder barrel 7 are arranged on the floor around the robot 1. Molten solder 6a and 7a is jetted in an upward direction in each of the primary flow solder barrel 6 and the secondary flow solder barrel 6 as shown in FIG. 2. When the substrate 4 clamped by the chuck mechanism 3 is transferred over the flow solder barrels 6 and 7, the bottom surface of the substrate 4 is contacted with the molten solder 6a and 7a for the flow soldering.

Figure 3:
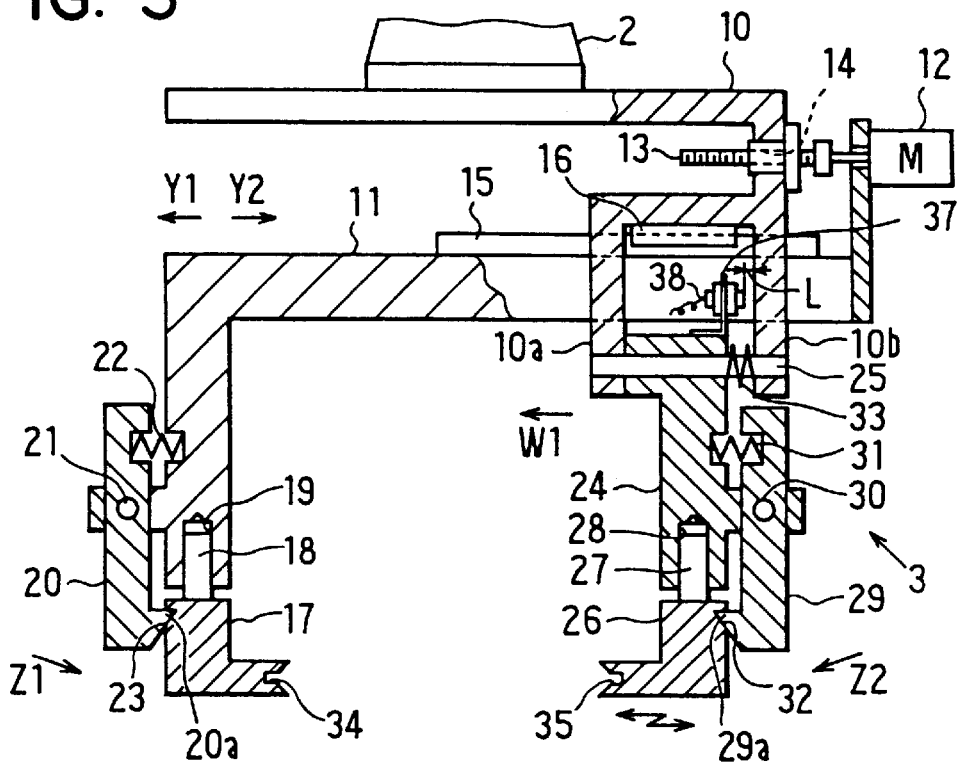
FIG. 3 is a vertical sectional view of a chuck mechanism used in the first embodiment.

The chuck mechanism 3 provided at the top end of the robot arm 2 is shown in FIG. 3 in vertical cross section. The chuck mechanism 3 has a first nail 17 and a second nail 26, which are driven by a motor 12 as a chuck actuator to approach to and leave from each other. Thus, the substrate 4 is held by approaching of the nails 17 and 26, and is released by leaving of the nails 17 and 26. That is, the first nail 17 holds one side end of the rectangular shape of the substrate 4, and the second nail 26 holds another side end which is opposite to the side end held by the first nail 17.

More specifically, a main frame 10 is attached to the robot arm 2. The main frame 10 has parallel plate parts 10a and 10b by which a frame 11 for the first nail 17 is supported slidably. The motor 12 for opening and closing the chuck nails is fixed to the frame 11 for the first nail 17. A feeder thread 13 is fixed to the output shaft of the motor 12, and the feeder thread 13 is thread-fitted in a threaded hole 14 formed in the main frame 10. The frame 11 for the first nail 17 is movable in a Y1 direction in the figure by the forward rotation of the output shaft of the motor 12, while it is movable in a Y2 direction in the figure by the reverse rotation of the output shaft of the motor 12. An AC servo motor is used as the motor 12 for opening and closing the chuck nail in this embodiment.

The frame 11 for the first nail has a guide rail 15, and the main frame 10 has a guide block 16. Thus, the frame 11 is movable while being guided by the guide rail 15 and the guide block 16.

The first nail 17 is supported detachably at the end of the frame 11. Specifically, a guide pin 18 is provided on the first nail 17, and the guide pin 18 is fitted into a guide hole 19 formed on the end of the frame 11. A hook 20 is supported rotatably by a shaft 21 near the end of the frame 11 for the first nail 17, and biased by a spring 22 in a Z1 direction in the figure. The first nail 17 is restricted from disengaging from the frame 11 as long as a nail 20a of the hook 20 is fitted into a recess 23 formed on a side face of the first nail 17.

A frame 24 for the second nail 26 is provided between the parallel plate parts 10a and 10b of the main frame 10. The frame 24 is supported movably in the horizontal direction by a shaft 25 bridging the parallel plate parts 10a and 10b. The second nail 26 is supported detachably at the end of the frame 24. Specifically, a guide pin 27 is provided on the second nail 26, and the guide pin 27 is fitted into a guide hole 28 formed on the end of the frame 24. A hook 29 is supported rotatably by a shaft 30 near the end of the frame 24, and is biased by a spring 31 in a Z2 direction in the figure. The second nail 26 is restricted from being disengaging from the frame 24 as long as a nail 29a of the hook 29 is fitted into a recess 32 formed on the side face of the second nail 26.

Further, a spring 33 is disposed between the parallel plate part 10b and the frame 24, between the parallel plate parts 10a and 10b of the main frame 10. The frame 24 is resiliently biased by the spring 33 in a W1 direction in parallel with the substrate 4 in the figure, that is, in the horizontal direction.

Figure 4:
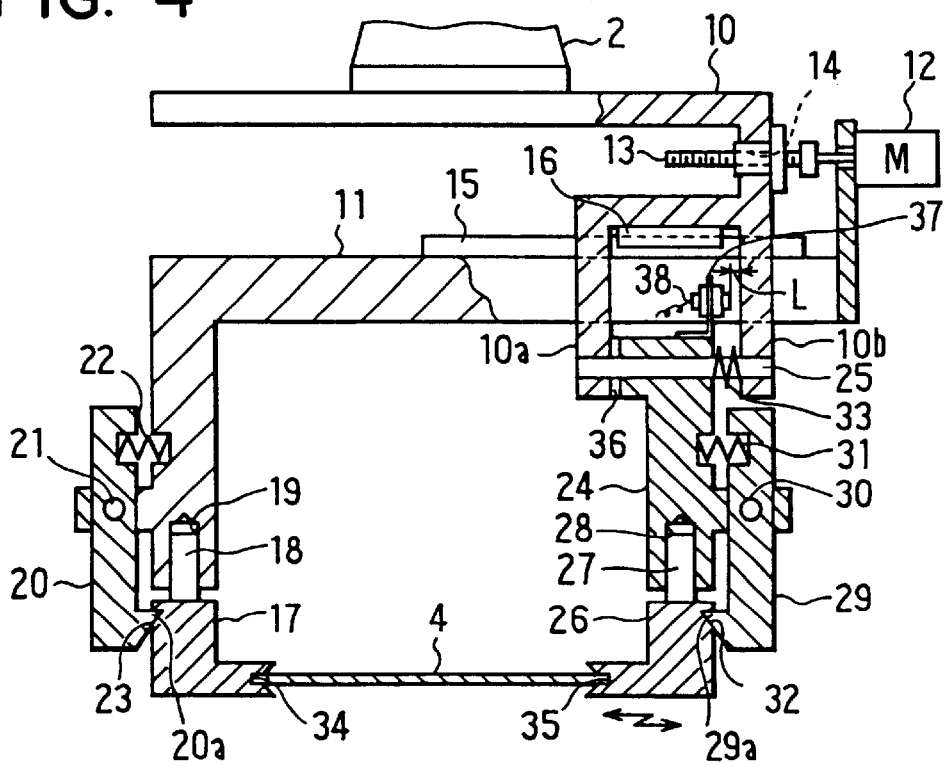
FIG. 4 is a vertical sectional view of the chuck mechanism clamping a substrate in the first embodiment.

The first nail 17 is formed in an L-shape in cross section, and is formed with a recess 34 at the top end thereof. Similarly, the second nail 26 is formed in an L-shape in cross section, and is formed with a recess 35 at the top end thereof to face the recess 34 of the first nail 17. Thus, the first nail 17 and the second nail 26 are constructed to be capable of clamping or sandwiching the substrate 4 between the recesses 34 and 35 as shown in FIG. 4. A spacing 36 is provided between the frame 24 and the parallel plate part 10a of the main frame 10 under the condition that the substrate 4 is sandwiched between the recess 34 of the first nail 17 and the recess 35 of the second nail 26.

According to the embodiment, the distance between the nails 17 and 26 are set to be a little (e.g., 2 mm) narrower than the actual width of the substrate 4 under the condition that the frame 24 is biased to contact with the plate part 10a by the spring 33 as shown in FIG. 3. Thus, the spacing 36 (e.g., 2 mm) is provided as shown in FIG. 4 when the frame 24 is moved away from the plate part 10a against the spring 33 to grip the substrate 4 between the nails 17 and 26.

Figure 5:
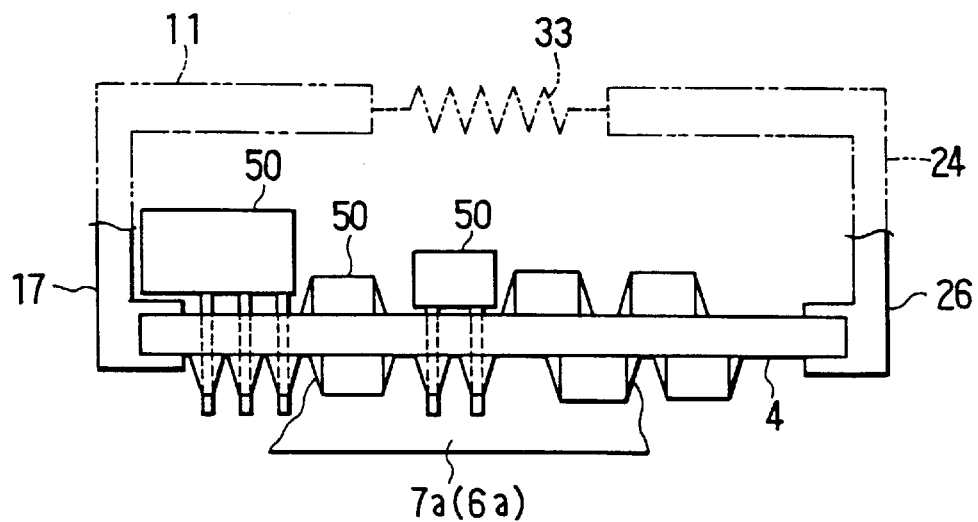
FIG. 5 is an enlarged schematic view of nails of the chuck mechanism clamping the substrate.

Thus, as shown schematically in FIG. 5, the spring 33 is provided between a clamping force transmitting mechanism which comprises the nails 17 and 26 of the chuck mechanism 3.

As shown in FIG. 3, an L-shaped attachment member 37 is fixed to the upper surface of the frame 24, and a distance sensor 38 is attached to the attachment member 37. The distance sensor 38 measures a distance L from the sensor 38 to the parallel plate part 10b of the main frame 10. This distance L corresponds to a distance of the spacing 36. Thus, this results in measurement of the compression state of the spring 33, that is, the spacing 36 which is provided when the substrate 4 is sandwiched by the nails 17 and 26. In this instance, the measured distance L becomes less than a predetermined value (threshold value), because the spacing 36 is widened when a foreign object is pinched between the recesses 34 and 35 of the nails 17 and 26. If this pinching of the foreign object is detected, the operation is stopped and an alarm is issued.

Operation of the flow soldering apparatus constructed as above is described next.

First, the robot 1 transfers the chuck mechanism 3 provided at the top end of the arm 2 to a tentative location of the substrate 4, and grips the substrate 4 by the nails 17 and 26 driven by the motor 12 of the chuck mechanism 3 as shown in FIG. 4. The substrate 4 is mounted with electronic circuit parts 50 as shown in FIG. 5, and is an article in which electrodes and the like are subjected to soldering.

The substrate 4 is transferred to a position above the pre-heater 5 shown in FIG. 1 by operation of the robot arm 2, so that the substrate 4 is pre-heated. The substrate 4 is then transferred over the primary solder barrel 6 as shown in FIG. 2 and immersed in the molten solder 6a. The molten solder 6a sticks to the bottom surface of the substrate 4, while the substrate 4 is moved in contact with the molten solder 6a.

Then, the substrate 4 is immersed in the molten solder 7a in the secondary flow solder barrel 7 by operation of the robot arm 2. The solder sticking to the substrate 4 is shaped by transferring the substrate 4 over the secondary flow solder barrel 7 while contacting the bottom surface of the substrate 4 with the molten solder 7a in the secondary solder barrel 7.

In the above operation, the substrate 4 expands thermally because it is immersed into the molten solder 6a and 7a. When the force of deformation or expansion of the substrate 4 exceeds the biasing force of the spring 33, the second nail 2 is moved to the right in FIG. 4. On the other hand, the substrate 4 cools down after the soldering and contracts. As the substrate 4 contracts, the second nail 26 is moved correspondingly to the left in FIG. 4 by the spring 33.

Thus, although the substrate 4 is clamped firmly by the nails 17 and 26 during the soldering operation, it is held to be able to expand without bowing in the upward or downward direction in FIG. 5. That is, the spring 33 allows expansion of the substrate 4 and restricts the bowing or deformation of the substrate 4, thus ensuring good soldering quality. It is to be noted that the spring 33 may be any types other than the compression type. Further, the spring 33 may be replaced with other members which are elastic and capable of absorbing the thermal expansion of the substrate 4.

(Second Embodiment)

Figure 6:
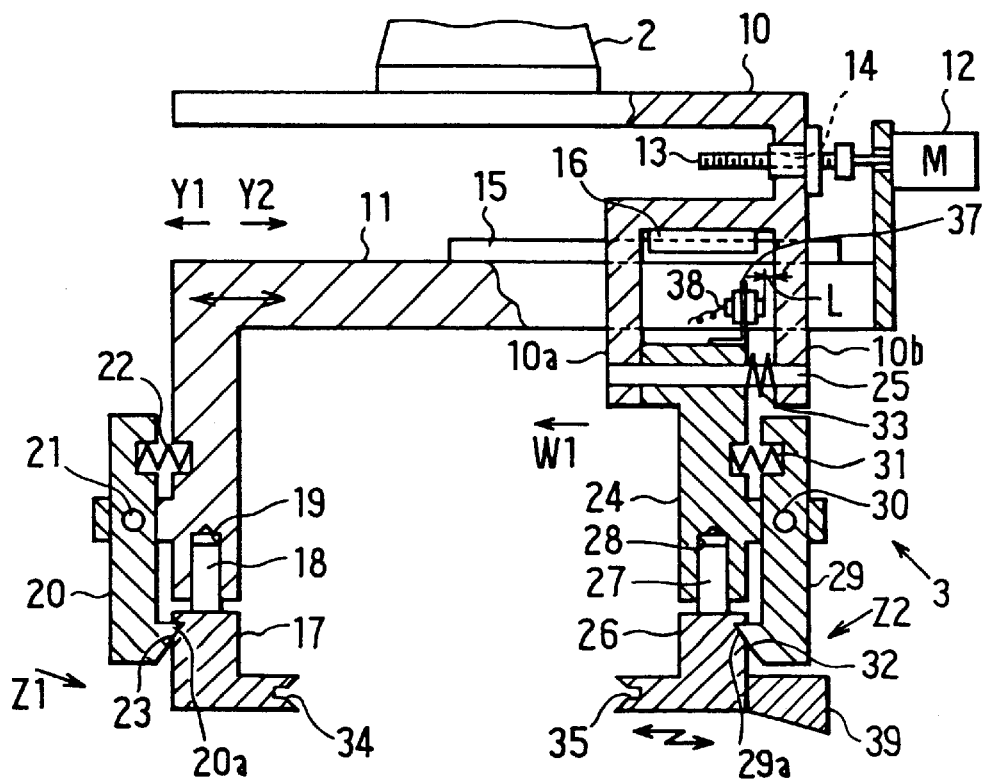
FIG. 6 is a vertical sectional view of a chuck mechanism used in a second embodiment.
Figure 7A:
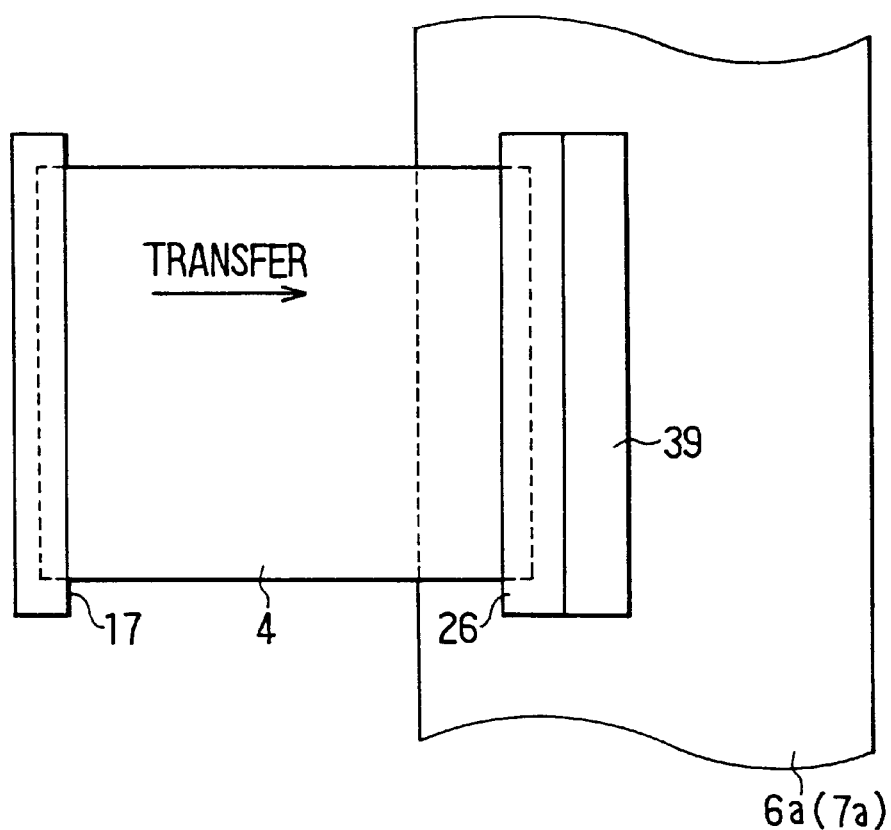
FIGS. 7A and 7B are enlarged plan view and side view showing an operation of the chuck mechanism shown in FIG. 6.

The second embodiment is constructed in the similar manner as the first embodiment. In the second embodiment, however, as shown in FIG. 6, a scraper nail 39 is provided on the front side (right side in the figure) of the second nail 26. The scraper nail 39 extends over the entire length of the front side of the second nail 26 as shown in FIG. 7A to remove or push away an oxide film formed on the molten solder 6a and 7a.

Figure 7B:
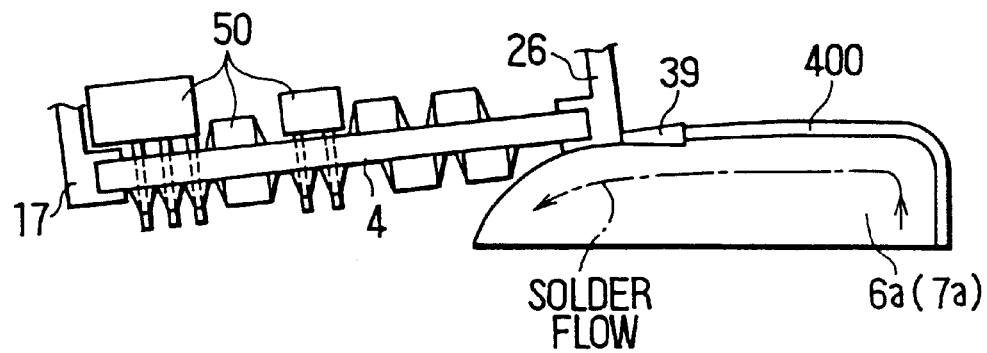
Figure 8:
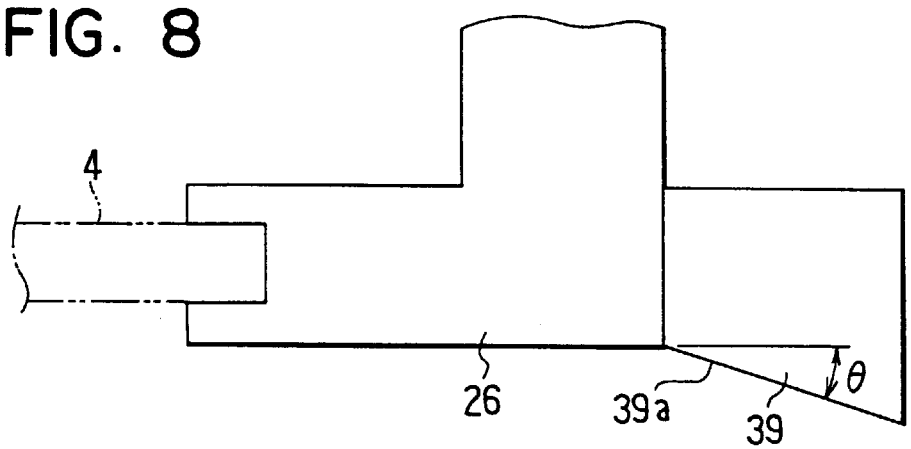
FIG. 8 is a side view of a scraper nail attached to the chuck mechanism shown in FIG. 6.

The scraper 39 has a cross section shown in FIG. 8. That is, the scraper 39 has a bottom surface 39a which is slanted by and angle θ relative to a horizontal plane so that the scraper nail 39 is thicker at the front side than at the rear side and thicker than the substrate 4. The angle θ is determined to maximize the efficiency of removing the oxide film 400 of the molten solder 6a and 7a, when the substrate is transferred in the right direction in FIG. 7B in an inclined manner with its front side being upheld. The depth of immersion of the substrate 4 in the solder 6a and 7a is preferably about 0.8 mm in the case of the substrate 4 having the thickness of about 1.6 mm.

Figure 9A:
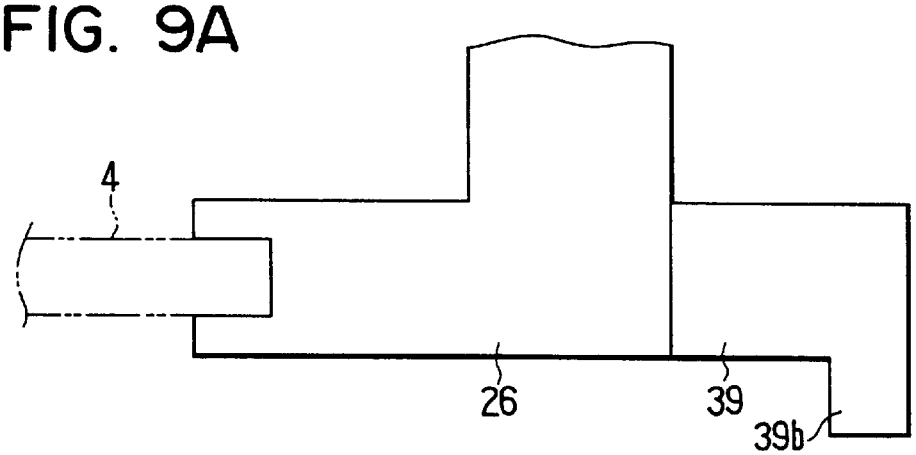
FIGS. 9A and 9B are side views showing a scraper nail and a second nail according to modifications of the second embodiment, respectively.
Figure 9B:
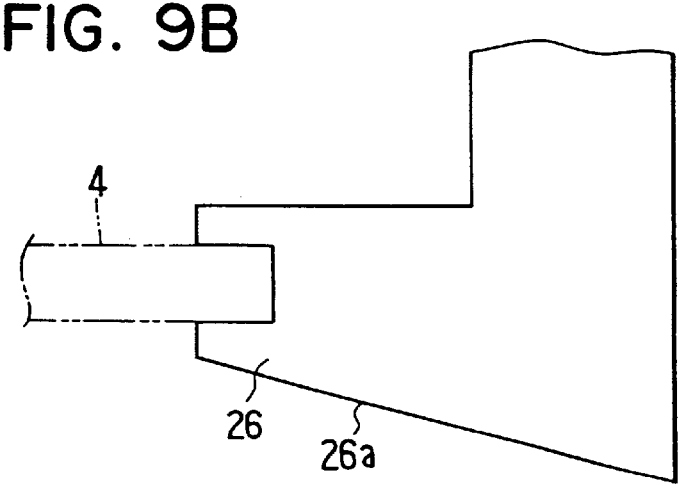

Alternatively, the scraper nail 39 may have an L-shaped cross section as shown in FIG. 9A. The scraper nail 39 has a flat bottom surface and has a projection 39b which projects in the downward direction and extends the entire length of the second nail 26 in the transverse direction. Further, the scraper nail 39 may be eliminated and the second nail 26 may be shaped to have a slanted bottom surface 26a which is slanted in the downward direction from its rearmost position to its frontmost position as shown in FIG. 9B. The molten solder 6a and 7a can flow all over the bottom surface of the substrate 4 even right behind the nail 26, because the slanted surface is provided closely to the front end of the substrate 4.

In operation, each time the substrate 4 clamped between the nails 17 and 26 is transferred to the solder barrels 6 and 7 to be immersed or immersed in the molten solder 6a and 7a, the oxide film 400 is pushed away by the scraper nail 39 before the substrate 4 comes into contact with the molten solder 6a and 7a. Here, no nails are provided on either sides of the chuck mechanism 3 with respect to the substrate transfer direction. That is, the chuck mechanism 3 is fully open at its lateral sides at least at a vertical position where the substrate 4 is held. As a result, the molten solder 6a and 7a is allowed to enter beneath the substrate 4 in the lateral direction, even when a space is caused underneath the substrate 4 right behind the second nail 26 due to the scraper nail 39. Thus, the molten solder 6a and 7a may directly contact the bottom surface of the substrate 4 for flow soldering. The oxide film 400 thus removed from the top of the molten solder 6a and 7a may be removed manually or automatically from the solder barrels 6a and 7.

According to the second embodiment, the scraper nail 39 provided at the front side of the second nail 26 in the substrate transfer direction effectively removes the oxide film 400 before contacting of the substrate 4 with the molten solder 6a and 7a to improve the quality of the soldering. Further, the scraper nail 39 need not be attached each time the soldering is effected, while a scraper nail will have to be attached each time if it is provided on the substrate 4.

In the second embodiment, the substrate 4 need not be transferred over the molten solder 6a and 7a in the inclined manner (FIG. 7B), but may be transferred horizontally. Further, the nails 17 and 26 may be arranged to grip the lateral sides of the substrate 4 with respect to the substrate transfer direction, while the scraper nail 39 is provided at the front side of the substrate 4. In this instance, the nails 17 and 26 are preferably shaped to allow the lateral flow of the molten solder 6a and 7a, for instance, by shortening the longitudinal length of the nails 17 and 26.

(Third Embodiment)

Figure 10:
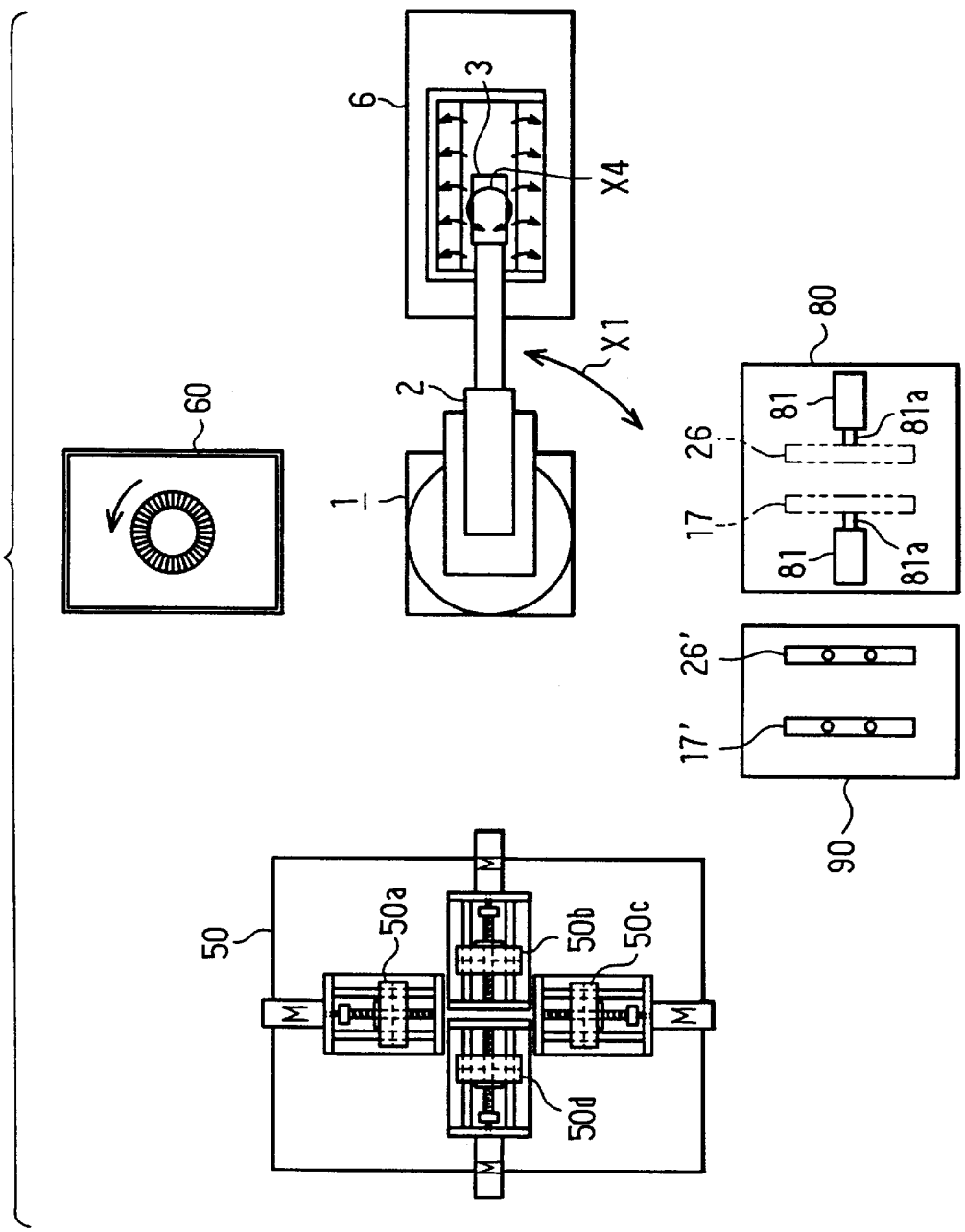
FIG. 10 is a schematic plan view of a flow soldering apparatus according to a third embodiment of the present invention.
Figure 11:
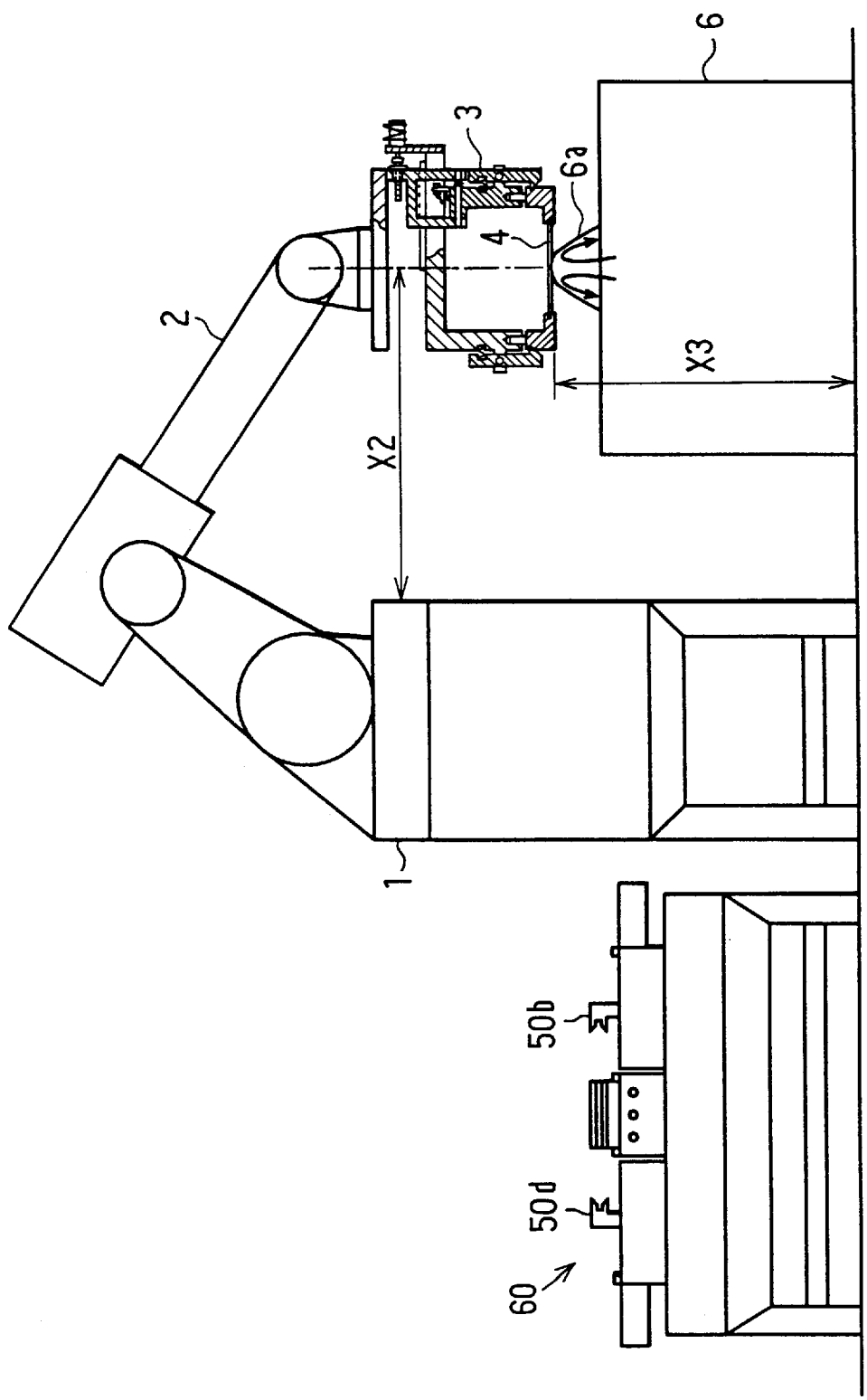
FIG. 11 is an elevational view of the flow soldering apparatus shown in FIG. 10.
Figure 12:
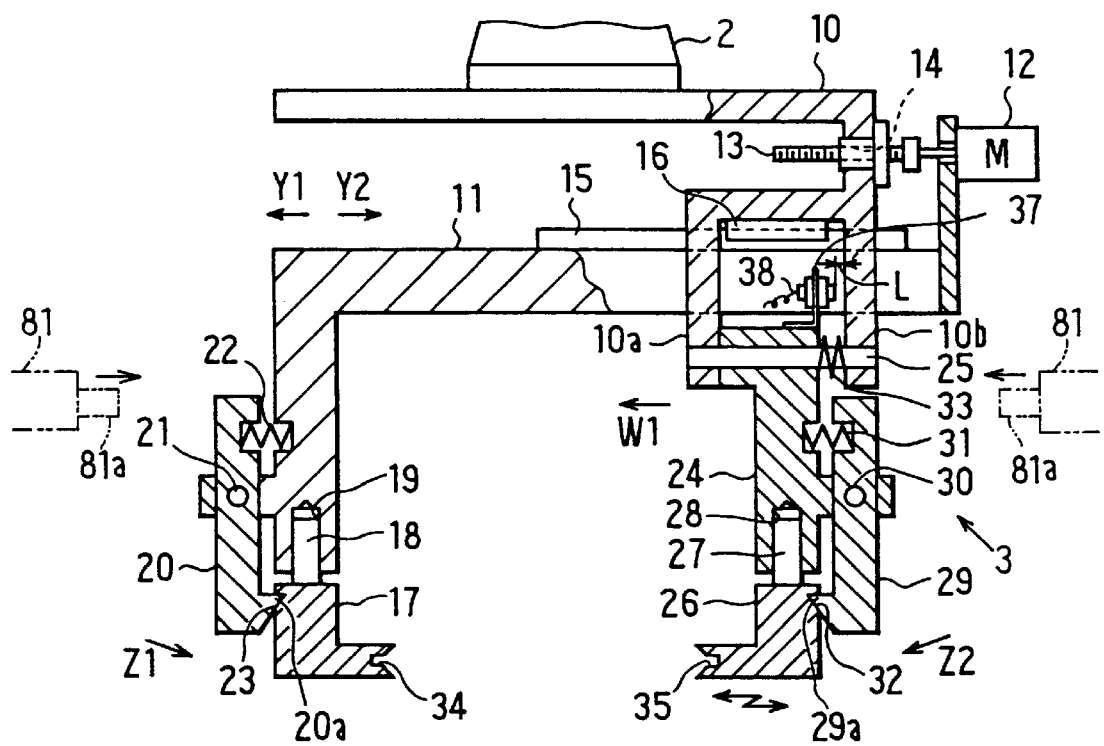
FIG. 12 is a vertical sectional view of a chuck mechanism used in the third embodiment.

In the third embodiment, as shown in FIGS. 10 and 11, the robot arm 2 is constructed to be capable of changing the horizontal position X1 (FIG. 10), the distance X2 (FIG. 11), the height (X3) and the direction (X4) of the chuck mechanism 3. Only one solder barrel 6 is shown in the figures. A grip changing device 50, a nail cleaning device (brush device) 60, a nail restoring device 80 and a nail exchanging device 90 are arranged around the robot 1 as well as the solder barrel 6. The chuck mechanism 3 is constructed, as shown in FIG. 12, in the same manner as in the first embodiment (FIGS. 3 and 4).

Figure 13:
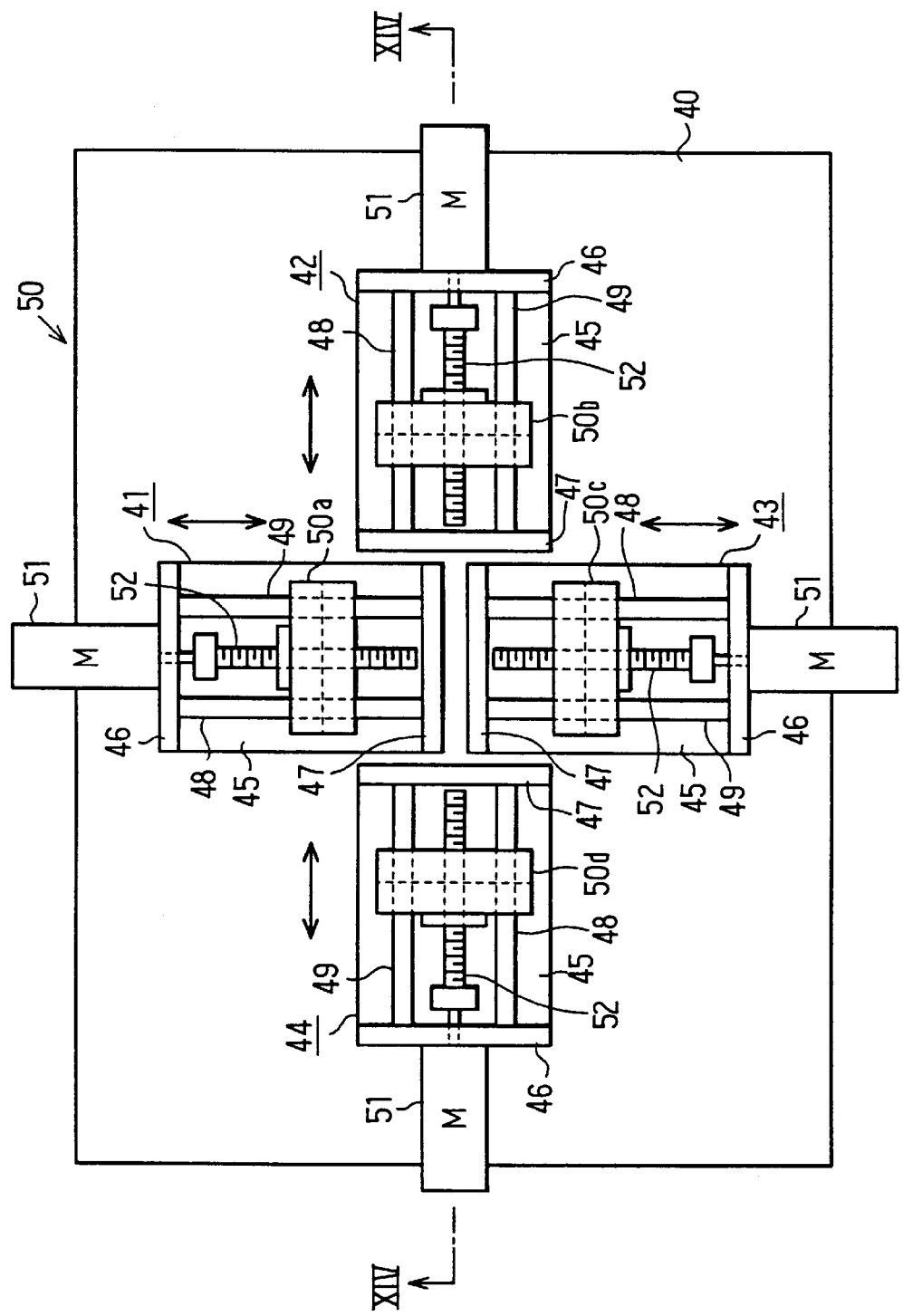
FIG. 13 is a plan view showing a grip changing device used in the third embodiment.
Figure 14:
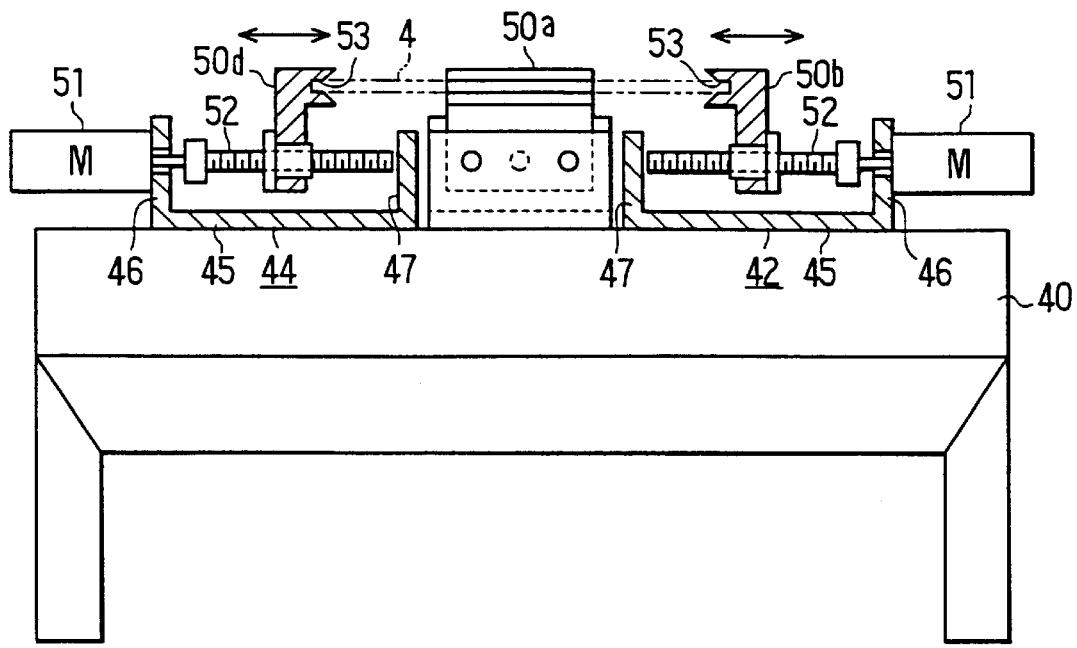
FIG. 14 is an elevational view of the grip changing device shown in FIG. 13.

The grip changing device 50 is shown in detail in FIGS. 13 and 14. The grip changing device 50 has a table 40, and four bases 41 to 44 are placed thereon in a radial direction, that is, at every 90 degrees. Each base comprises a horizontal part 45 and vertical parts 46 and 47. Two guide rails 48 and 49 are placed in parallel between the vertical parts 46 and 47.

Nails 50a to 50d are supported slidably on the guide rails 48 and 49 of the bases 41 to 44, respectively.

A motor 51 is attached to each vertical part 46 and a feeder thread 52 is fixed to the output shaft of the motor 51. The feeder thread 52 is engaged with each of the nails 50a to 50d to drive the nails 50a to 50d independently from each other. Thus, the nails 50a and 50c are moved to approach to each other and leave from each other, and the nails 50b and 50d are moved to approach to each other and leave from each other. Each of the nails 50a to 50d has a recess 53 so that the substrate 4 may be clamped or sandwiched by the two opposing nails, that is, by the nails 50a and 50c or by the nails 50b and 50d.

Figure 15:
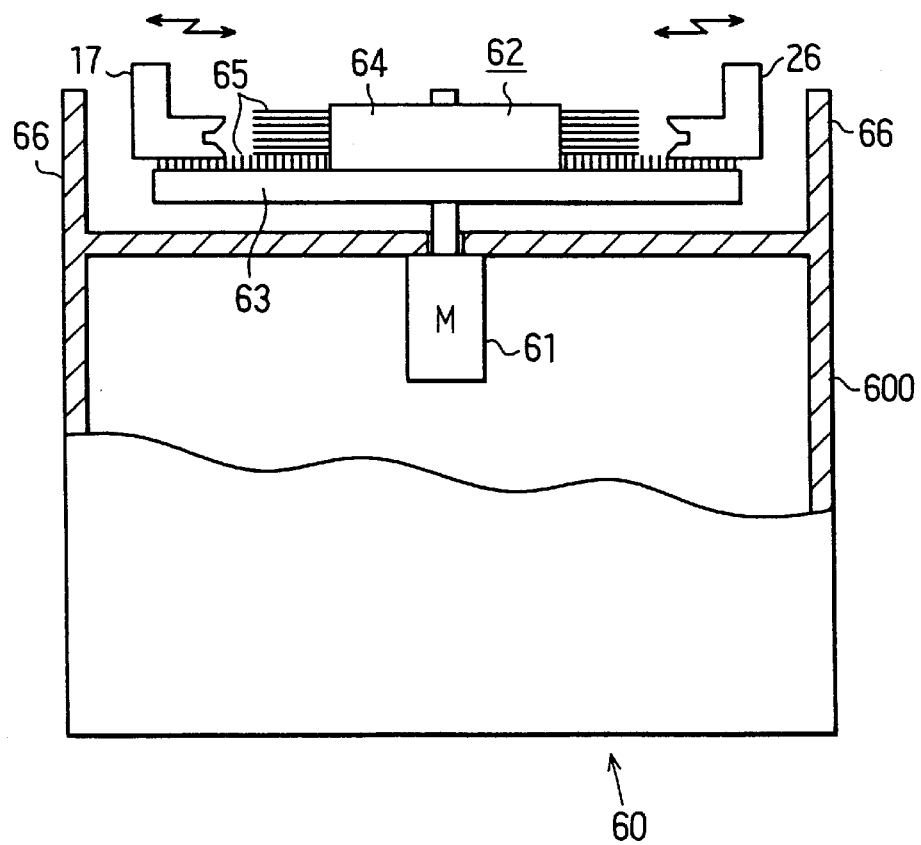
FIG. 15 is an elevational view of a cleaning device used in the third embodiment.
Figure 16A:
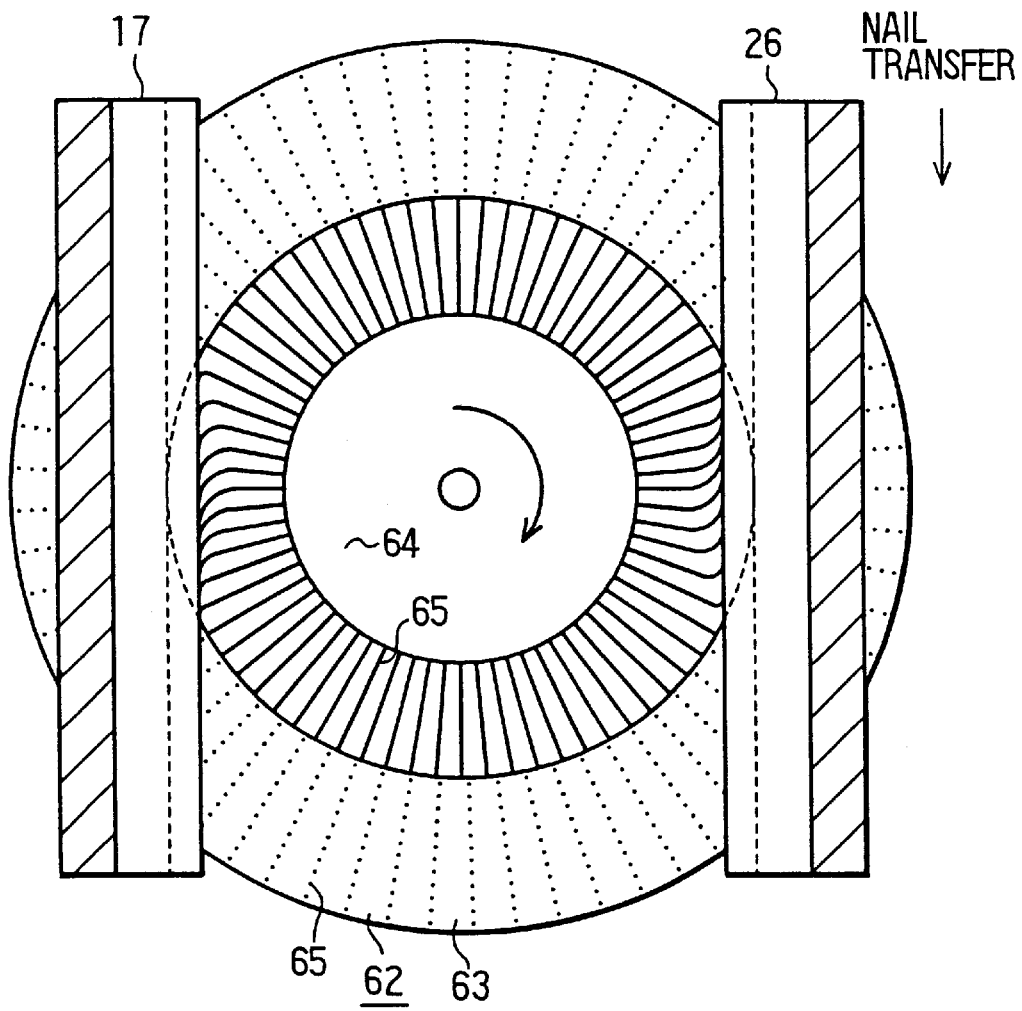
FIGS. 16A and 16B are a top plan view and a side view of a brush body of the cleaning device shown in FIG. 15.
Figure 16B:
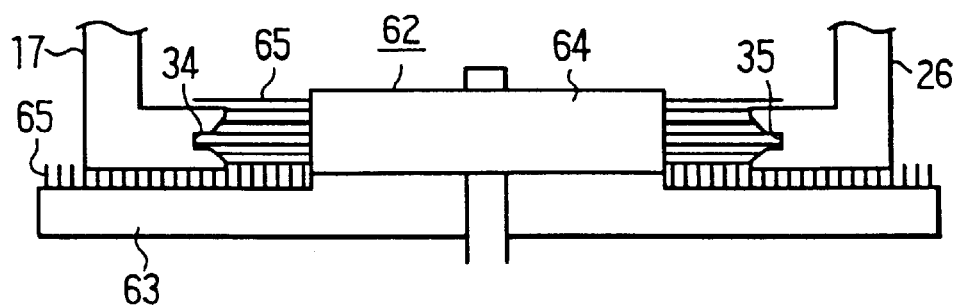

The brush device 60 is shown in detail in FIGS. 15 and 16. The brush device 60 has a casing 600 in which a motor 61 is accommodated. A brush body 62 is placed above the casing 600 and is coupled with the output shaft of the motor 61. The brush body 62 has a disk plate 63 and a cylinder 64. Brushes 65 are fixed to both the upper side of the disk plate 63 and the outer peripheral side of the cylinder 64. The solder sticking to the recesses 34 and 35 of the nails 17 and 26 and the underside of the nails 17 and 26 is removed by the brushes, when the nails 17 and 26 are transferred to contact with the brushes 65 which is in rotation as shown in FIG. 16. The casing 600 has an upper extension 66 which surrounds the brush body 62, so that the removed solder does not scatter to the outside beyond the extension 66.

Figure 17A:
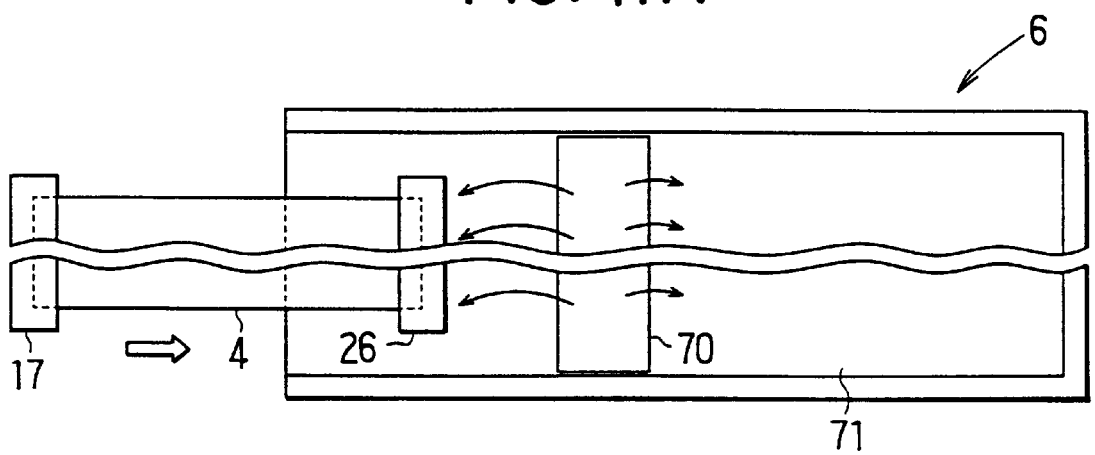
FIGS. 17A and 17B are top plan view and a side view of a solder barrel used in the third embodiment.
Figure 17B:
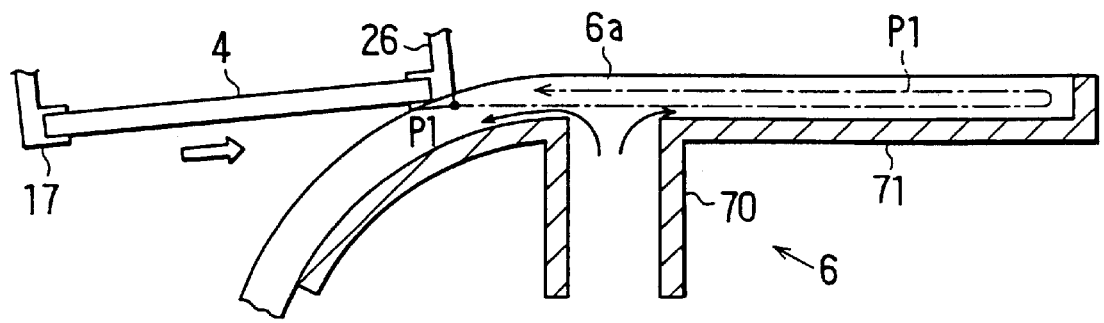

As shown in FIGS. 17A and 17B, the solder barrel 6 has a jet pipe 70 directed upward and a tray 71 is connected to the top end of the pipe 70. The tray 71 has a bottom which extends horizontally at one side (right side in FIG. 17A) of the pipe 70 and downwardly at the other side (left side in FIG. 17B). The molten solder is jetted from the pipe 70 upward, so that the molten solder 6a provides a generally flat horizontal surface in the tray 71 and flows out along the downward-directed bottom of the tray 71. The substrate 4 is transferred in contact with the molten solder 6a in a manner that the bottom end P1 of the nail 26 moves through the molten solder 6a as shown by a dot-chain line in FIG. 17B.

Referring back to FIG. 10, the nail restoring device 80 has two hook releasing actuators having respective rods 81a. Each rod 81a is extendable and retractable. When the rods 81a extend in the arrow direction in FIG. 12 and contact the hooks 20 and 29, the hooks 20 and 29 are rotated to release the nails 17 and 26 from the frames 11 and 24 of the chuck mechanism 3. Another set of nails 17' and 26' which are to be attached to the frames 11 and 24 in exchange for the nails 17 and 26 are stored on the nail exchange device 90.

Figure 18:
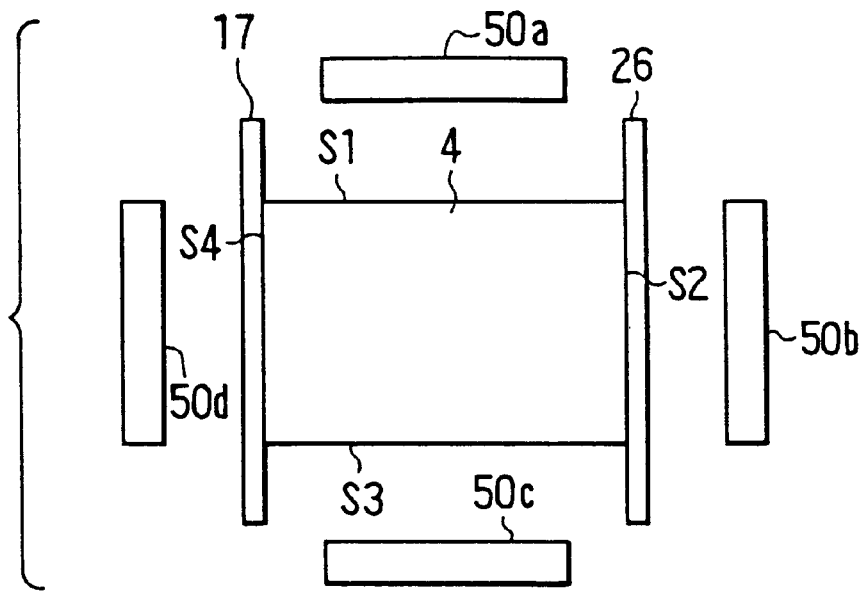
FIGS. 18 to 24 are schematic views showing a grip changing operation of the grip changing device in the third embodiment.

In operation, the chuck mechanism 3 is moved by the robot 1 to a position where substrates shaped in rectangle are stored and grips two opposing sides S2 and S4 (FIG. 18) of the substrate 4 between the nails 17 and 26. The sides S2 and S4 are shorter than the sides S1 and S3. Here, each nail 17 and 26 has the length longer than that of the sides S2 and S4.

The substrate 4 is then transferred to the solder barrel 6 and immersed in the molten solder 6a while holding the nails 26 and 17 at the front side and the rear side, respectively, with respect to the substrate transfer direction. The substrate 4 is inclined with its front end being slightly elevated and moved in the barrel 6 in the forward direction and then in the reverse direction as shown in FIG. 17B so that the bottom surface of the solder 4 is held in contact with the molten solder 6a. Alternatively, the substrate 4 may be held horizontally without any inclination. The depth of immersion is preferably about one half of the thickness of the substrate 4. In this instance, the front side and the rear side of the substrate 4 are masked or covered with the nails 26 and 17, respectively. As a result, the substrate 4 is protected from the solder waves which are caused by the jetting of the molten solder and the movement of the substrate 4.

Figure 19:
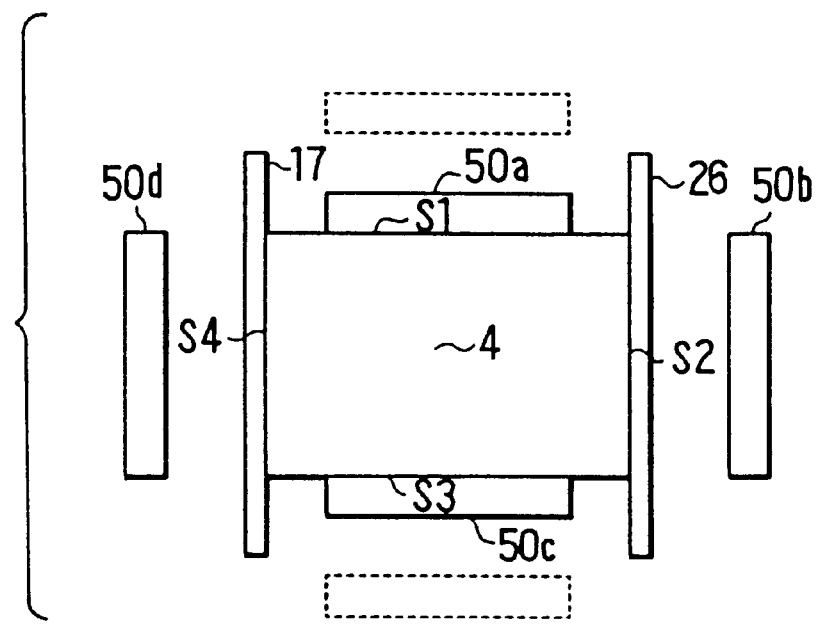
Figure 20:
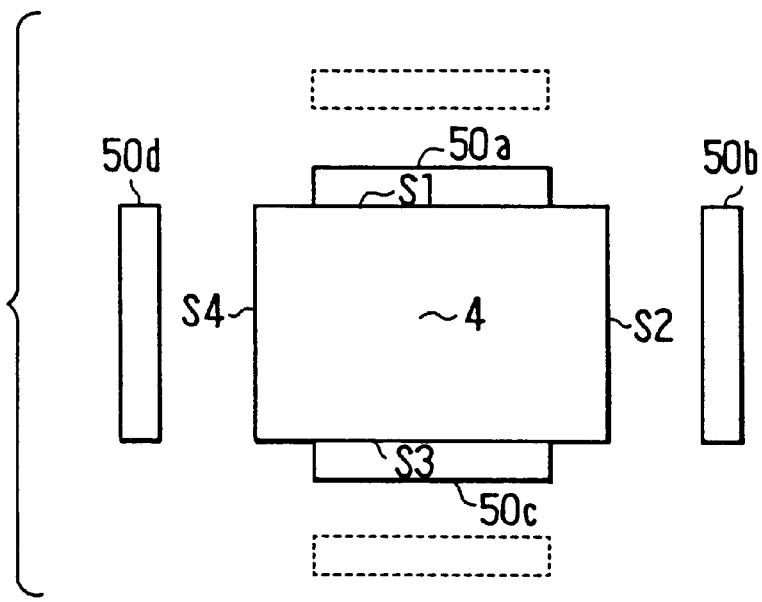

The substrate 4 pulled out of the barrel 6 is transferred to the grip changing device 50. The chuck nails 50a and 50c are driven to approach and grip the longer sides S1 and S3 of the substrate 4 as shown in FIG. 19. The nails 50b and 50d are not driven and held at the initial position which is most distant from the substrate 4. Then the nails 17 and 26 of the chuck mechanism 3 are driven to move away from the substrate 4 as shown in FIG. 20.

Figure 21:
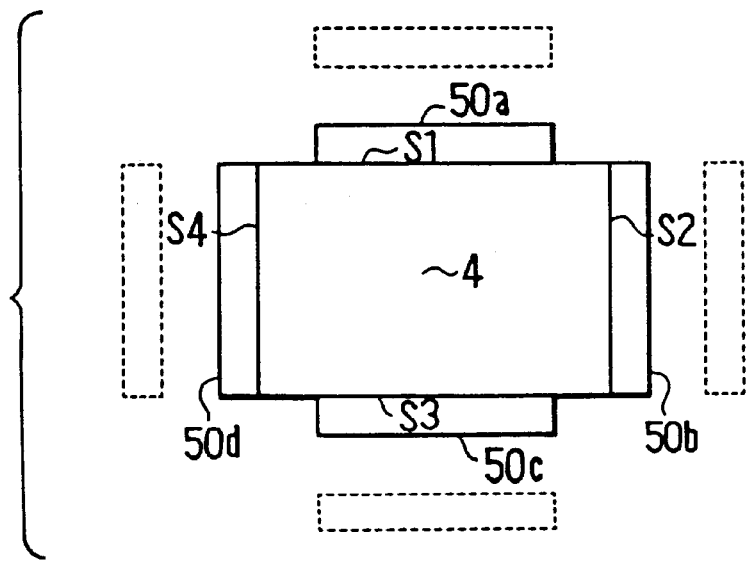
Figure 22:
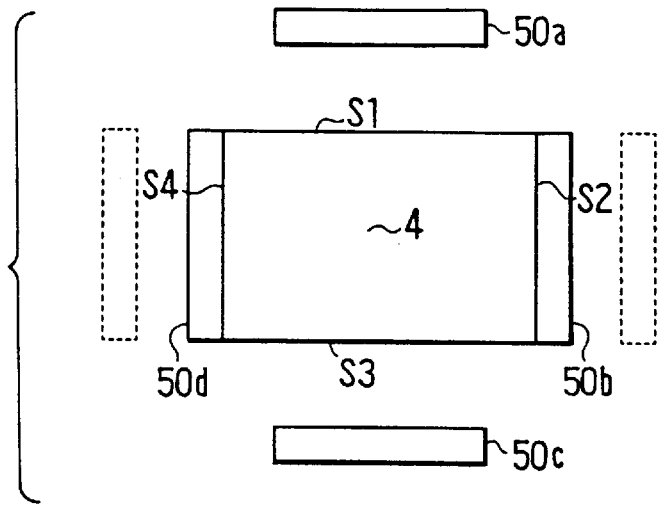
Figure 23:
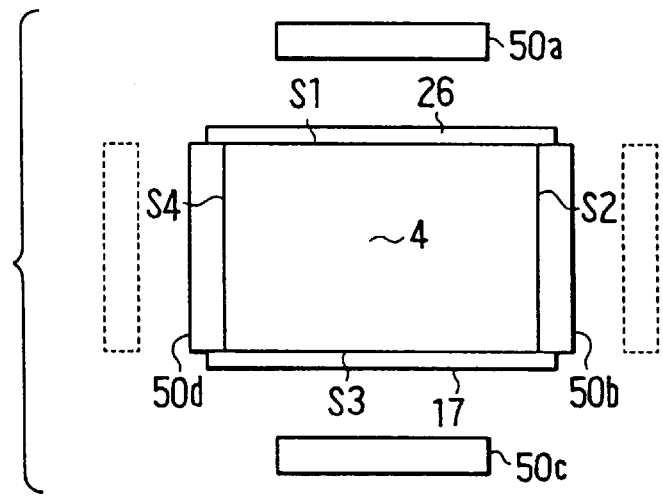

The nails 50b and 50d are driven subsequently to approach and grip the shorter sides S2 and S4 of the substrate 4 as shown in FIG. 21. The nails 50a and 50c are then driven to leave away from the sides S1 and S3 as shown in FIG. 22.

The chuck mechanism 3 which has released the substrate 4 as above is then moved to the cleaning device 60. The nails 17 and 26 are driven radially inwardly to approach each other in a direction to sandwich the brush body 62 as shown in FIG. 15. The nails 17 and 26 are cleaned by the brushes 65 rotated by the motor 61.

Figure 24:
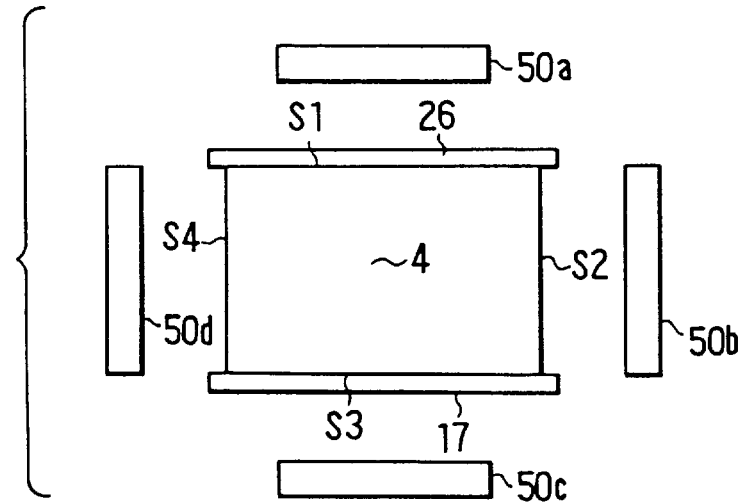

After the cleaning, the nails 17 and 26 are moved radially outwardly from the brush body 62, and the chuck mechanism 3 is returned to the grip changing device 50. The chuck mechanism 3 is rotated 90 degrees to grip the longer sides S1 and S3 of the substrate 4 by the nails 17 and 26. The chuck nails 50b and 50d of the bases 42 and 44 are driven to leave away from the substrate 4 as shown in FIG. 24. Thus, the nails 17 and 26 of the chuck mechanism 3 which have been clamping the shorter sides S2 and S4 of the substrate 4 are changed to grip the longer sides S1 and S3 of the substrate 4.

If the distance sensor 38 detects that the distance L is shorter than the reference when the nails 17 and 26 grip the substrate 4, it is determined that the solder remains in the recesses 34 and 35 of the nails 17 and 26 because of imcomplete cleaning by the brush device 60. In this instance, the nails 17 and 26 are exchanged with new ones at the nail restoring device 80.

Specifically, the clamping of the substrate 4 is stopped and the chuck mechanism 3 is moved to the nail restoring device 8. The hooks 20 and 29 are actuated by the actuators 81 to ratate and release the nails 17 and 26 from the frames 11 and 24 of the chuck mechanism 3. The new nails 17' and 26' stored on the nail exchange device 90 are clamped and fitted in the frames 11 and 24. That is, the nail exchange is effected by fitting the pins 18 and 27 of the nails 17' and 26' into the holes 19 and 28.

The nails 17 and 26 removed from the chuck mechanism 3 are transferred to the other location from the nail restoring device 80 so that a next nail removal may be effected on the nail restoring device 80. Further, each time the nail exchange is completed, a new set of nails 17' and 26' is supplied for the next nail exchange operation.

After changing the position of clamping the substrate 4, the chuck mechanism 3 transfers the substrate 4 to the solder barrel 6 for the soldering operation while holding the longer sides S1 and S3 in the forward and reverse directions with respect to the substrate transfer direction on the barrel 6.

In the soldering operation in the solder barrel 6, the nails 17 and 26 grip and mask the substrate 4 over the entire length of the front side and the rear side of the substrate 4 with respect to the substrate transfer direction during one return travel over the solder 6a, the solder 6a does not jump onto the upper surface of the substrate 4. Here, the soldering is effected from all sides of the substrate 4, because the position of clamping the substrate 4 is changed after one soldering operation in the solder barrel 6 and the direction of transferring the substrate 4 is reversed in each soldering operation. As a result, the substrate 4 has the soldered parts are soldered to the substrate 4 with a high quality.

In the third embodiment, the nails 17 and 26 of the chuck mechanism 3 need not be exchanged with the new ones in the case that the substrate 4 has sides S1 to S4 shorter than the length of the nails 17 and 26. Further, the position of clamping the substrate 4 may be effected by turning the substrate 4 on the grip changing device 50 in place of turning the chuck mechanism 3. In the similar manner as in the first embodiment and in the second embodiment, the solder barrel 6 in the third embodiment may be used solely for the primary soldering operation for attaching the molten solder 6a to the bottom side of the substrate, and another solder barrel may be used for a secondary soldering operation for shaping the solder sticking to the bottom side of the substrate 4.

The present invention should not be limited to the disclosed embodiments and modifications, but may be implemented in many other ways without departing from the spirit of the invention as defined by the following claims.

What is claimed is:

1. A flow soldering apparatus for a substrate comprising:
    a solder barrel for jetting a molten solder toward the substrate;
    a chuck mechanism having a pair of movable nails for clamping opposing side ends of the substrate;
    transfer means for transferring the check mechanism over the solder barrel while contacting the substrate with the molten solder;
    resilient means disposed in the chuck mechanism to resiliently hold the substrate between the movable nails; and
    a distance sensor provided in the chuck mechanism for measuring a biasing force of the resilient means corresponding to a distance between the movable nails.

2. A flow soldering apparatus of claim 1, wherein a soldering operation is stopped when the measured biasing force exceeds a threshold reference under the condition that the substrate is clamped by the movable nails.

3. A flow soldering apparatus of claim 1, wherein the transfer means includes a robot arm.

4. A flow soldering apparatus of claim 1, wherein the resilient means includes a spring disposed to movably hold at least one of the nails in parallel with the substrate.

5. A flow soldering apparatus of claim 4, further comprising:
    means for guiding the at least one of the nails in a horizontal direction.

6. A flow soldering apparatus for a substrate comprising:
    a solder barrel for jetting a molten solder upward toward the substrate;
    a chuck mechanism having a nail for clamping the substrate;
    transfer means for transferring the chuck mechanism over the solder barrel while contacting the substrate with the molten solder; and
    a part provided at a front side of the chuck mechanism with respect to a substrate transfer direction for removing an oxide film formed over the molten solder, the part extending over an entire lateral length of the front side of the substrate while allowing the molten solder to flow beneath the substrate in a lateral direction with respect to the substrate transfer direction.

7. A flow soldering apparatus of claim 6, wherein the nail is positioned at a front side of the substrate with respect to the substrate transfer direction.

8. A flow soldering apparatus of claim 6, wherein the chuck mechanism is open at its lateral sides with respect to the substrate transfer direction to allow a lateral flow of the molten solder right behind the nail.

9. A flow soldering apparatus of claim 6, wherein the part has a bottom surface slanted in a downward direction more at its front side than at its rear side.

10. A flow soldering apparatus of claim 9, wherein the bottom surface of the part extends from its front-most position to a position where the substrate is clamped.

11. A flow soldering apparatus of claim 6, including means for immersing the part in the molten solder to a position deeper than a boundary between the oxide film and the molten solder.

12. A flow soldering apparatus of claim 6, wherein the part comprises the nail, and the chuck mechanism is open at its lateral sides with respect to the substrate transfer direction to allow a lateral flow of the molten solder right behind the nail.

13. A flow soldering apparatus of claim 12, wherein the nail has a bottom surface slanted in a downward direction more at a front side of the nail than at a rear side of the nail.

14. A flow soldering apparatus of claim 6, wherein the transfer means includes a robot arm and the molten solder has a substantially smooth surface.

15. A flow soldering apparatus of claim 6, further comprising:
    resilient means disposed in the chuck mechanism to resiliently hold the substrate between the movable nails in a direction parallel with the substrate.

16. A flow soldering apparatus for a substrate shaped in a rectangle comprising:
    a solder barrel for storing a molten solder;
    a chuck mechanism having a first nail and a second nail for clamping a set of two opposing sides of the substrate, the first nail being extended to cover an entire length of one of the two opposing sides of the substrate and the second nail being extended to cover an entire length of the other of the two opposing sides of the substrate;
    a grip changing device for changing the set of the two opposing sides of the substrate from one to the other of the rectangle; and
    transfer means for transferring the chuck mechanism between the solder barrel and the grip changing means, the transfer means further transferring the chuck mechanism over the solder barrel while maintaining the first nail and the second nail at a front and rear sides with respect to a substrate transfer direction and contacting the substrate with the molten solder irrespective of the set of the two opposing sides of the substrate.

17. A flow soldering apparatus of claim 16, further comprising:
    a cleaning device for removing the solder sticking to the first nail and the second nail after the substrate is subjected to a soldering in the solder barrel and is released from clamping by the first nail and the second nail.

18. A flow soldering apparatus of claim 16, further comprising:
    a nail exchanging device for exchanging the first nail and the second nail with new nails before changing the set of opposing two sides of the substrate by the grip changing means, when the solder remains sticking to the first nail and the second nail.

19. A flow soldering apparatus of claim 18, further comprising:
    a distance sensor for detecting a parameter indicative of the solder remaining on the first nail and the second nail thereby to indicate a necessity of a nail exchange by the nail exchanging device.

* * * * *